US010346230B2

(12) United States Patent
Jayaraman

(10) Patent No.: US 10,346,230 B2
(45) Date of Patent: *Jul. 9, 2019

(54) MANAGING FAULTS IN A HIGH AVAILABILITY SYSTEM

(71) Applicant: INTERNATIONAL BUSINESS MACHINES CORPORATION, Armonk, NY (US)

(72) Inventor: Arunachalam Jayaraman, Chennai (IN)

(73) Assignee: International Business Machines Corporation, Armonk, NY (US)

(*) Notice: Subject to any disclaimer, the term of this patent is extended or adjusted under 35 U.S.C. 154(b) by 51 days.

This patent is subject to a terminal disclaimer.

(21) Appl. No.: 15/635,684

(22) Filed: Jun. 28, 2017

(65) Prior Publication Data

US 2017/0300373 A1   Oct. 19, 2017

Related U.S. Application Data

(63) Continuation of application No. 14/089,852, filed on Nov. 26, 2013, now Pat. No. 9,798,598.

(51) Int. Cl.
*G06F 11/07* (2006.01)
*G06F 11/00* (2006.01)

(52) U.S. Cl.
CPC ........ *G06F 11/0751* (2013.01); *G06F 11/008* (2013.01); *G06F 11/0706* (2013.01); *G06F 11/079* (2013.01); *G06F 11/0769* (2013.01)

(58) Field of Classification Search
CPC .......................... G06F 11/008; G06F 11/3466

USPC ............................................... 714/47.2, 47.3
See application file for complete search history.

(56) References Cited

U.S. PATENT DOCUMENTS

| 4,853,932 | A  | 8/1989  | Nitschke et al.   |
|-----------|----|---------|-------------------|
| 8,428,983 | B2 | 4/2013  | Bobak et al.      |
| 8,566,637 | B1 | 10/2013 | Puhov et al.      |
| 2003/0051187 | A1 | 3/2003 | Mashayekhi et al. |
| 2005/0289401 | A1 | 12/2005 | Goin et al.      |
| 2006/0026467 | A1 | 2/2006 | Nehab et al.     |
| 2006/0059253 | A1 | 3/2006 | Goodman et al.   |
| 2008/0244319 | A1 | 10/2008 | Nehab et al.    |
| 2009/0249129 | A1 | 10/2009 | Femia            |

(Continued)

OTHER PUBLICATIONS

Notice of Allowance (dated Jun. 15, 2017) for U.S. Appl. No. 14/089,852, filed Nov. 26, 2013; Confirmation No. 1985.

*Primary Examiner* — Chae M Ko
(74) *Attorney, Agent, or Firm* — Schmeisser, Olsen & Watts; Mark C. Vallone

(57) ABSTRACT

An approach is provided for managing a failure of a critical high availability (HA) component. Weights are received and assigned to categories of critical HA components in a HA system. A current value indicating a performance of a component included in the identified components is obtained by periodically monitoring the components. A reference value for the performance of the component is received. A deviation between the current value and the reference value is determined. Based on the deviation, the component is determined to have failed. Based in part on the failed component, the categories, and the weights, a health index is determined in real-time. The health index indicates in part how much the component having failed affects a measure of health of the HA system.

14 Claims, 9 Drawing Sheets

(56) References Cited

U.S. PATENT DOCUMENTS

| | | |
|---|---|---|
| 2010/0292959 A1 | 11/2010 | Gross et al. |
| 2011/0239048 A1 | 9/2011 | Andrade et al. |
| 2012/0047394 A1 | 2/2012 | Jain et al. |
| 2012/0233501 A1 | 9/2012 | Kanso et al. |
| 2012/0297307 A1 | 11/2012 | Rider et al. |
| 2015/0149835 A1* | 5/2015 | Jayaraman .......... G06F 11/0751 714/48 |
| 2016/0205174 A1* | 7/2016 | Pitio ...................... H04L 67/10 709/201 |
| 2016/0292611 A1* | 10/2016 | Boe .................. G06Q 10/06393 |

* cited by examiner

MANAGING FAULTS IN A HIGH AVAILABILITY SYSTEM

This application is a continuation application claiming priority to Ser. No. 14/089,852 filed Nov. 26, 2013, now U.S. Pat. No. 9,798,598 issued Oct. 24, 2017.

TECHNICAL FIELD

The present invention relates to a data processing method and system for managing software and hardware failures in a system, and more particularly to self-healing of faults and prediction of fault reoccurrence in high availability systems in real-time.

BACKGROUND

Known information technology (IT) systems that attempt to make services continuously available (i.e., highly available), regardless of hardware and software failures, include: (1) fault tolerant systems and (2) fault resilient systems. A fault tolerant system tolerates any software and/or hardware fault within a system boundary and continues to provide services without any interruption. Every critical component in the fault tolerant system is duplicated, allowing replaceable components to sit idle as standby components, thereby creating a system that is not cost effective. A fault resilient system (also known as (a.k.a.) a high availability (HA) cluster) replicates only a few of the critical software and hardware components to increase overall availability of the system compared to a standalone system. By replicating only some of the critical components, the fault resilient system is an economical alternative to the fault tolerant system.

HA system failover is mostly event-based. The success or failure of the HA system failover in real time can be predicted by monitoring the individual events occurring during the failover. Existing tools, however, cannot predict and investigate the actual root cause of the failure of component(s) associated with a single event or events.

BRIEF SUMMARY

In a first embodiment, the present invention provides a method of managing a failure of a critical high availability (HA) component. The method includes a computer identifying a plurality of critical HA components of a HA system. The method further includes the computer receiving and assigning categories to the plurality of critical HA components. The method further includes the computer receiving and assigning weights to the categories. The method further includes the computer obtaining a current value indicating a performance of a critical HA component included in the plurality of critical HA components. The current value is obtained by periodically monitoring the plurality of critical HA components. The method further includes the computer receiving a reference value for the performance of the critical HA component. The method further includes the computer determining a deviation between the current value and the reference value. The method further includes, based on the deviation, the computer determining the critical HA component has failed. The method further includes, based in part on the failed critical HA component, the categories, and the weights, the computer determining a health index in real-time. The health index indicates in part how much the critical HA component having failed affects a measure of health of the HA system.

In a second embodiment, the present invention provides a computer program product including a computer-readable, tangible storage device and a computer-readable program code stored in the computer-readable, tangible storage device. The computer-readable program code includes instructions that are executed by a central processing unit (CPU) of a computer system to implement a method of managing a failure of a critical high availability (HA) component. The method includes a computer system identifying a plurality of critical HA components of a HA system. The method further includes the computer system receiving and assigning categories to the plurality of critical HA components. The method further includes the computer system receiving and assigning weights to the categories. The method further includes the computer system obtaining a current value indicating a performance of a critical HA component included in the plurality of critical HA components. The current value is obtained by periodically monitoring the plurality of critical HA components. The method further includes the computer system receiving a reference value for the performance of the critical HA component. The method further includes the computer system determining a deviation between the current value and the reference value. The method further includes, based on the deviation, the computer system determining the critical HA component has failed. The method further includes, based in part on the failed critical HA component, the categories, and the weights, the computer system determining a health index in real-time. The health index indicates in part how much the critical HA component having failed affects a measure of health of the HA system.

In a third embodiment, the present invention provides a method of predicting a reoccurrence of a failure of a critical high availability (HA) component. The method includes a computer determining a real-time failover is happening based on a failure of a HA system. The method further includes the computer determining an actual amount of time taken by an event occurring during the failover. The method further includes the computer receiving a reference amount of time that the event occurring during the failover is expected to take. The method further includes the computer determining the actual amount of time is not equal to the reference amount of time within a predefined tolerance. The method further includes, based on the actual amount of time being not equal to the reference amount of time, the computer predicting the failure will reoccur unless a fault is repaired. The method further includes the computer identifying critical HA components participating in the event. The critical HA components are included in the HA system. The method further includes the computer determining a critical HA component included in the identified critical HA components has failed based on the fault and invoking self-healing to repair the fault in the critical HA component by performing a branch based decision making process on the identified critical HA components.

Embodiments of the present invention enhance an existing HA system by increasing the availability of a service hosted by the system. Embodiments of the present invention provide real time HA health index reporting at any time, self-healing for simple and medium software errors, and continuous HA monitoring, while avoiding a need to run HA failover periodically, thereby saving a significant amount of money in labor costs.

DETAILED DESCRIPTION

Overview

Embodiments of the present invention enhance an existing HA system with a framework that is used for intelligent decision making to invoke self-healing of HA faults in real-time. The framework is configured to capture the time taken for each cluster event and compare the captured time with a reference value to predict in real-time a reoccurrence of a fault. The HA system enhanced by the aforementioned framework may be a hybrid of a fault tolerant system and a fault resilient system. Embodiments of the present invention provide an index indicating the health of a HA system in real-time, without requiring a HA failover test to indicate the health of the HA system. A failover is an automatic operation that switches to a redundant or standby system or node in the event of a software, hardware, or network failure. Failover testing includes testing how well an application is able to recover from a software, hardware, or network failure by forcing a failure of the software, hardware or network in a variety of ways to verify the recovery is properly performed. The real-time health of the HA system includes an indication of how far the system is from being completely healthy (i.e., having no failed components), where the indication is based in part on a proportion of critical HA components in the HA system that have a failed status and in part on weighted categories of the components.

System for Managing HA Faults

Figure 1:
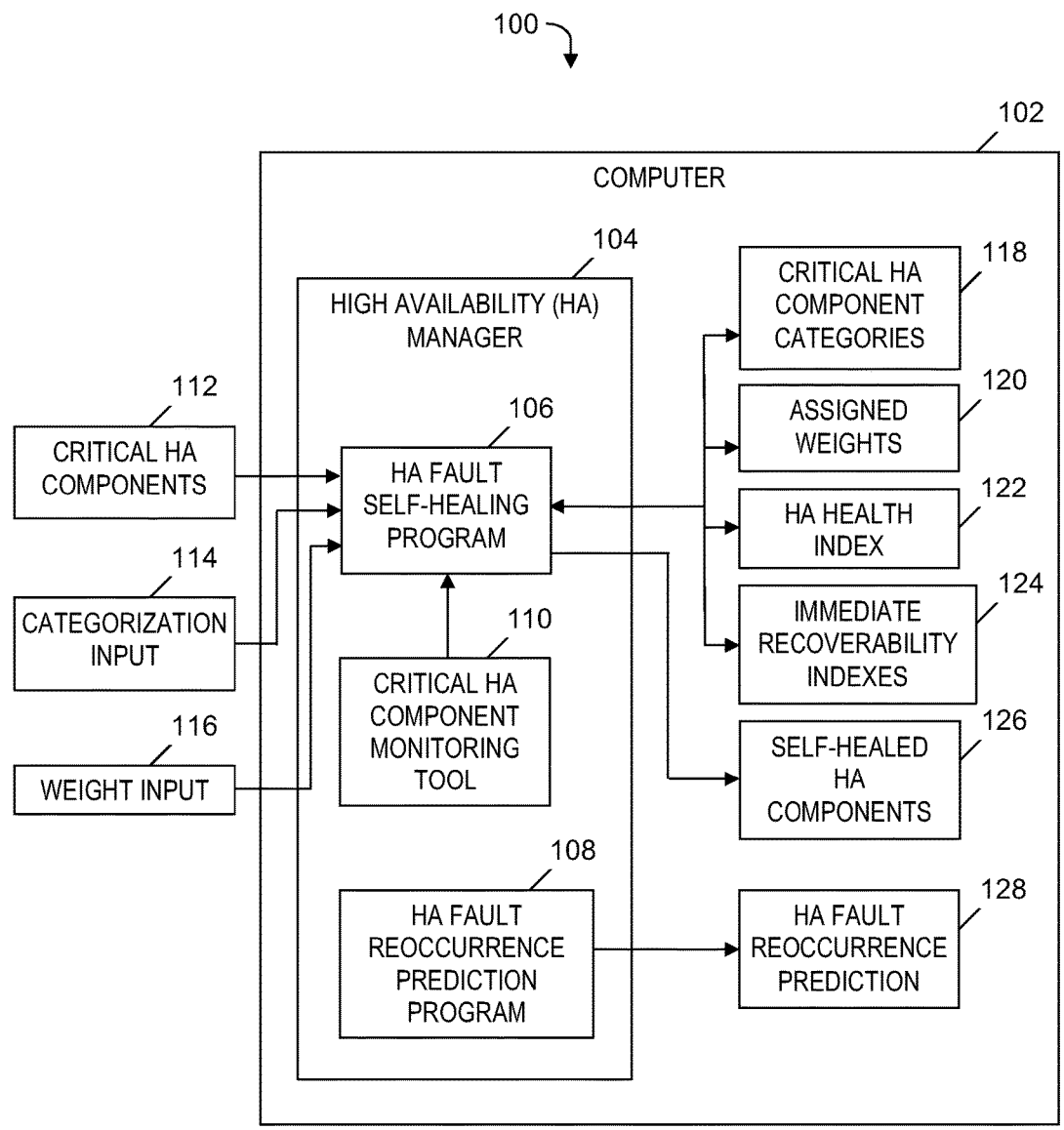
FIG. 1 is a block diagram of a system for managing HA faults, in accordance with embodiments of the present invention.

FIG. 1 is a block diagram of a system for managing HA faults, in accordance with embodiments of the present invention. A system 100 includes a computer 102, which executes a software-based HA manager 104, which includes a HA fault self-healing program 106, a HA fault reoccurrence prediction program 108, and a critical HA component monitoring tool 110. HA fault self-healing program 106 receives identifiers of critical HA components 112, categorization input 114, and weight input 116. Critical HA component monitoring tool 110 periodically monitors critical HA components 112 to determine which of the critical HA components 112 have failed.

HA fault self-healing program 106 determines categories 118 of critical HA components 112 and assigned weights 120, and based on categories 118 and assigned weights 120, determines a HA health index 122. HA fault self-healing program 106 uses categorization input 114 to determine categories 118 of the critical HA components 112, and uses weight input 116 to determine assigned weights 120, which are assigned to critical HA components 112 and to critical HA components 112 which have failed.

HA fault self-healing program 106 assigns immediate recoverability indexes (IRIs) 124 to respective critical HA components 112 that have failed. HA fault self-healing program 106 employs branch based decision making to invoke self-healing of the critical HA components that have failed and that are immediately recoverable based on the IRIs 124. Branch based decision making is described below relative to FIGS. 2A-2B and FIGS. 3A-3B. The results of the branch based decision making are self-healed HA components 126, which are fixed critical HA components that previously were critical HA components 112 that had failed.

HA fault reoccurrence prediction program 108 monitors the changes in the states of critical HA components 112. Based on the monitored changes, HA fault reoccurrence prediction program 108 generates an HA fault reoccurrence prediction 128, which predicts a reoccurrence of an HA fault in one of the critical HA components 112.

HA manager 104 stores critical HA component categories 118, assigned weights 120, HA health index 122, immediate recoverability indexes 124, identifiers of self-healed HA components 126 and HA fault reoccurrence prediction 128 in one or more data repositories (not shown), such as databases.

In one embodiment, HA manager 104 provides a framework deployed over a known HA system regardless of the operating system and the HA vendor, where the known HA system includes one or more of the following hardware and software means for identifying and nullifying single point of failure components:

Duplicating boot disks

Establish alternative network connectivity with a different network segment

Duplicate and double the power supply

Duplicate remote management in more than one network

Duplicate backup and restore for the operating system and data

Duplicate storage area network (SAN) and connectivity with an alternate path

Individually or collectively manage operating system/disk subsystem, SAN subsystem, cluster subsystem, backup and restore, remote management, power supply, and network subsystem by a cluster subsystem In one embodiment, the HA manager 104 provides program 106 and program 108 as a supervising intelligent agent that exploits the framework of a known HA system along with other system management tools, such as IBM® Tivoli® Monitoring offered by International Business Machines Corporation located in Armonk, N.Y.

The functionality of the components of FIG. 1 is described in more detail in the discussion presented below relative to FIGS. 2A-2B, FIGS. 3A-3B, FIG. 4, and FIGS. 5A-5B.

Process for Managing Ha Faults

Figure 2A:
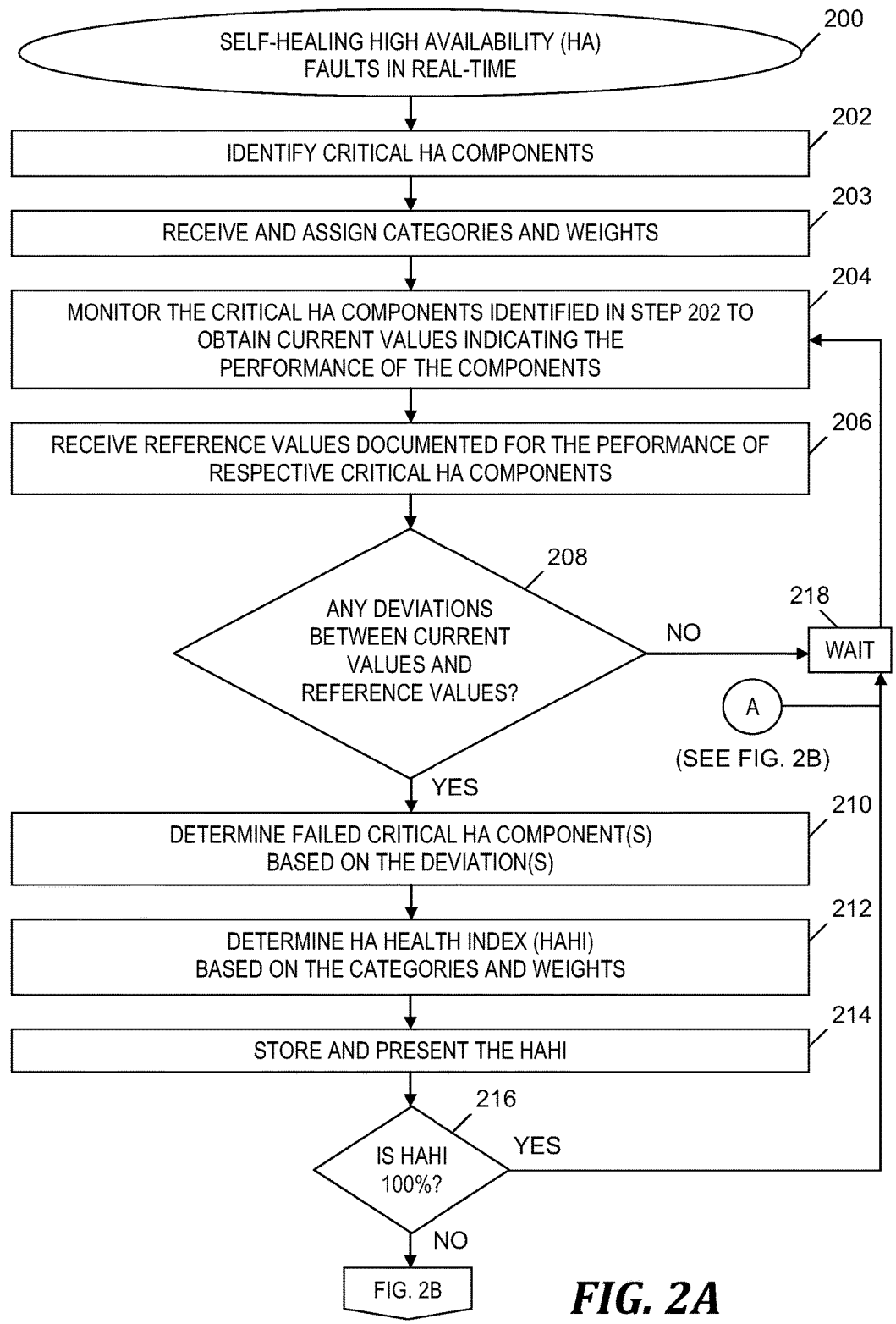
FIGS. 2A-2B depict a flowchart of a process for self-healing HA faults in real-time, in accordance with embodiments of the present invention.
Figure 2B:
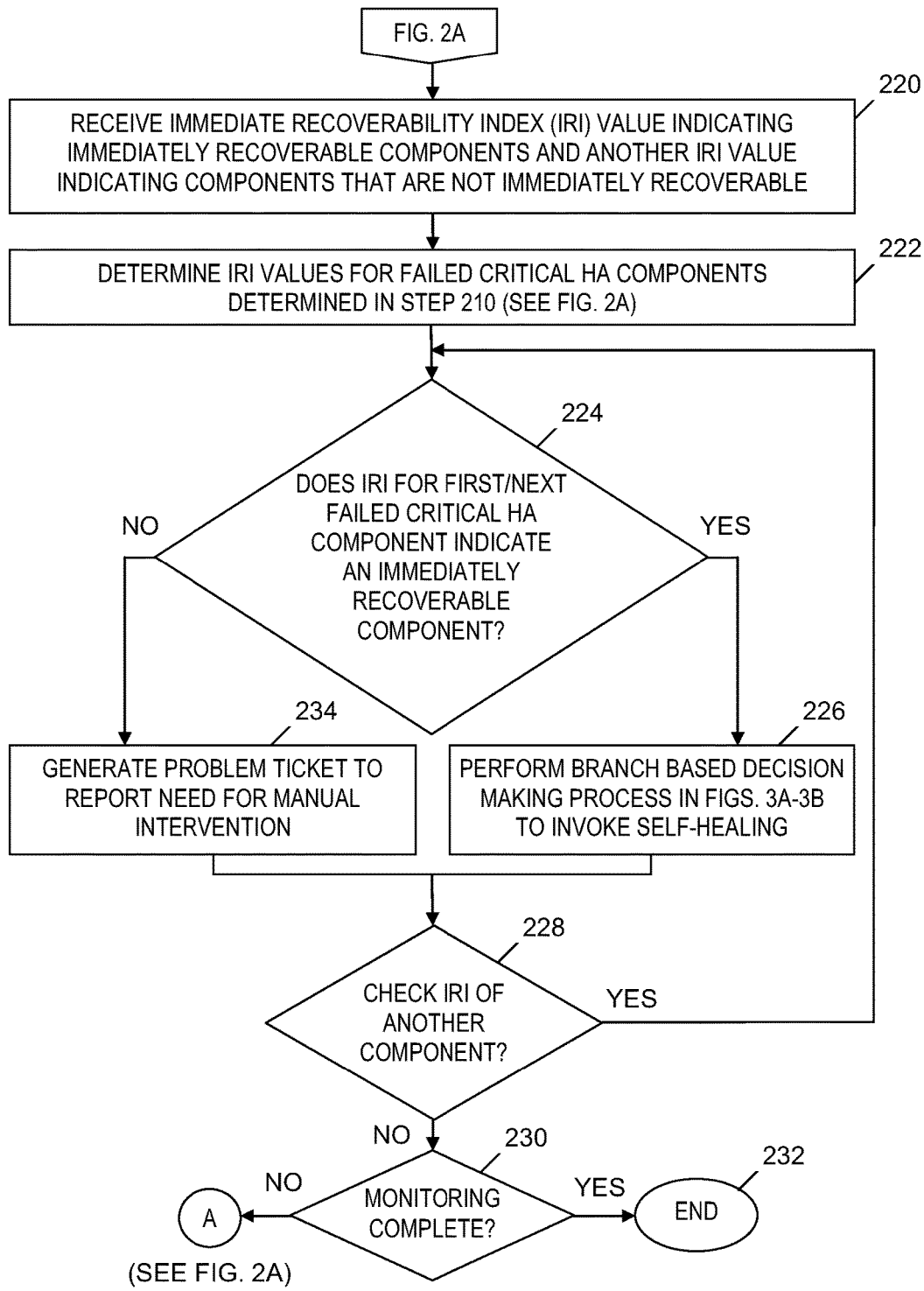

FIGS. 2A-2B depict a flowchart of a process for self-healing HA faults in real-time, in accordance with embodiments of the present invention. The process for self-healing HA faults in real-time starts at step 200. In step 202, HA fault self-healing program 106 (see FIG. 1) identifies critical HA components 112 (see FIG. 1) by receiving from one or more human subject matter experts (SMEs) identifiers and/or names of HA components that the SME(s) consider to be critical HA components 112 (see FIG. 1), along with the environment or subsystem in which the critical HA components 112 (see FIG. 1) are classified. For example, step 202 may include receiving components of dual boot disks in a boot environment, physical host bus adapter in a disk subsystem, physical network adapter in a network subsystem, etc.

Table 1 presented below includes an example of information received by HA fault self-healing program 106 (see FIG. 1) in step 202.

TABLE 1

| Serial number | Environment/ Subsystem | Component |
|---|---|---|
| 1 | Boot environment | Dual boot disks |
| 2 | Boot environment | Bootability of each boot disk |
| 3 | Disk subsystem | Physical host bus adapter |
| 4 | Disk subsystems | SAN data disks |
| 5 | Disk subsystem | SAN dual paths |
| 6 | Disk subsystems | Shared data volume groups |

TABLE 1-continued

| Serial number | Environment/ Subsystem | Component |
|---|---|---|
| 7 | Disk subsystems | Shared data volumes |
| 8 | Disk subsystems | Filesystem mount point |
| 9 | Disk subsystems | Filesystem mount point permission |
| 10 | Disk subsystem | Quorum disks (if any) |
| 11 | Power supply subsystem | Dual Power supply |
| 12 | Network subsystem | Physical network adapter |
| 13 | Network subsystem | Private IP address |
| 14 | Network subsystem | Public IP address |
| 15 | Network subsystem | Cluster heart beat network |
| 16 | Cluster subsystems | Cluster services daemons |
| 17 | Cluster subsystems | Application startup/stop scripts |
| 18 | Cluster subsystems | Application startup/stop scripts permission |
| 19 | Cluster subsystems | Cluster nodes |
| 20 | Timezone subsystems | Cluster global time |
| 21 | Timezone subsystems | Network time protocol |

In step 203, HA fault self-healing program 106 (see FIG. 1) receives categorization input 114 (see FIG. 1) from SME(s) and assigns categories 118 (see FIG. 1) included in categorization input 114 (see FIG. 1) to respective critical HA components 112 (see FIG. 1) identified in step 202. In one embodiment, step 203 includes receiving three categories: (1) leaf components, (2) stem components, and (3) root components. Each leaf component depends on a stem component, and each stem component depends on a root component. A single root component has one or more stem components that depend on the root component. A single stem component has one or more leaf components that depend on the stem component. For example, in step 203, the category of root component is received and assigned to dual boot disks, the category of stem component is received and assigned to public Internet Protocol address in a network subsystem, and the category of leaf component is received and assigned to filesystem mount point in disk subsystems.

Table 2 presented below includes an example of categories 118 (see FIG. 1) that are assigned in step 203 to the critical HA components 112 (see FIG. 1) identified in step 202. The assignments of categories are not limited to the components shown in Table 2.

TABLE 2

| Serial number | Environment/ Subsystem | Component | Category |
|---|---|---|---|
| 1 | Boot environment | Dual boot disks | Root |
| 2 | Boot environment | Bootability of each boot disk | Root |
| 3 | Disk subsystem | Physical host bus adapter | Root |
| 4 | Disk subsystems | SAN data disks | Root |
| 5 | Disk subsystem | SAN dual paths | Root |
| 6 | Disk subsystems | Shared data volume groups | Root |
| 7 | Disk subsystems | Shared data volumes | Stem |
| 8 | Disk subsystems | Filesystem mount point | Leaf |
| 9 | Disk subsystems | Filesystem mount point permission | Leaf |
| 10 | Disk subsystem | Quorum disks (if any) | Root |
| 11 | Power supply subsystem | Dual Power supply | Root |
| 12 | Network subsystem | Physical network adapter | Root |
| 13 | Network subsystem | Private IP address | Stem |
| 14 | Network subsystem | Public IP address | Stem |
| 15 | Network subsystem | Cluster heart beat network | Root |
| 16 | Cluster subsystems | Cluster services daemons | Root |
| 17 | Cluster subsystems | Application startup/stop scripts | Leaf |
| 18 | Cluster subsystems | Application startup/stop scripts permission | Leaf |
| 19 | Cluster subsystems | Cluster nodes | Root |
| 20 | Timezone subsystems | Cluster global time | Root |
| 21 | Timezone subsystems | Network time protocol | Root |

Also in step 203, HA fault self-healing program 106 (see FIG. 1) receives weight input 116 (see FIG. 1) from SME(s) and assigns weights 120 (see FIG. 1) included in weight input 116 (see FIG. 1) to respective categories 118 (see FIG. 1). In one embodiment, step 203 includes receiving the weights 1, 2 and 3, where 1 is assigned to the leaf component category, 2 is assigned to the stem component category, and 3 is assigned to the root component category. The weight of the root category is greater than the weight of the stem and leaf categories because a failure in a root component may have multiple failures in the particular branch for which it is the root. As used herein, a branch describes a group of components that include a root component (i.e., a component in the root category), a stem component (i.e., a component in the stem category) that depends on the root component, and a leaf component (i.e., a component in the leaf category) that depends on the stem component. The weight assigned to each category provides a measure of how critical a component is to the HA system and how likely a fault in the component will have a ripple effect on child components that depend on that component. Alternatively, any or all of the weights 1, 2 and 3 may be replaced with other weights. For example, components in the leaf component category may be assigned a weight of 1, components in the stem component category may be assigned a weight of 2, and components in the root component category may be assigned a weight of 5.

Table 3 presented below includes weights 120 (see FIG. 1) that are assigned in step 203 to the categories 118 (see FIG. 1).

TABLE 3

| Category of HA component | Weight |
|---|---|
| Leaf | 1 |
| Stem | 2 |
| Root | 3 |

In step 204, critical HA component monitoring tool 110 (see FIG. 1) monitors the critical HA components 112 (see FIG. 1) identified in step 202 to obtain current, real-time values that specify the performance of the critical HA components 112 (see FIG. 1). The monitoring in step 204 includes obtaining values from a standard operating system monitoring profile and a standard cluster monitoring profile.

In step 206, HA fault self-healing program 106 (see FIG. 1) receives reference values documented for non-faulty performance of critical HA components 112 (see FIG. 1). Each reference value received in step 206 corresponds to a respective current value obtained in step 204.

In step 208, HA fault self-healing program 106 (see FIG. 1) determines whether there are any deviations between the current values obtained in step 204 and the corresponding reference values received in step 206. If HA fault self-healing program 106 (see FIG. 1) determines in step 208 that there are deviations between the current values and the corresponding reference values, then the Yes branch of step 208 is taken and step 210 is performed.

In step 210, HA fault self-healing program 106 (see FIG. 1) determines one or more of the critical HA components 112 (see FIG. 1) that have failed. A failed critical HA component is indicated by the current value associated with the performance of the critical HA component obtained in step 204 not matching the corresponding reference value received in step 206.

In step 212, HA fault self-healing program 106 (see FIG. 1) determines HA health index (HAHI) 122 (see FIG. 1) based on categories 118 (see FIG. 1) and assigned weights 120 (see FIG. 1).

In one embodiment, step 212 determines HAHI according to the equation presented below:

HAHI={{{a sum, over all categories received in step 203, of the number (i.e., a count) of critical HA components in a category×weight of the category}−{a sum, over all categories received in step 203, of the number of failed critical HA components in a category×weight of the category}}/{a sum, over all categories received in step 203, of the number of critical HA components×weight of the category}}*100%, which is equivalent to equation (1) presented below:

$$\{\{\{(C_1 \times W_1)+(C_2 \times W_2)\} \ldots +(C_n \times W_n)\}-\{(FC_1 \times W_1)+(FC_2 \times W_2) \ldots +(FC_n \times W_n)\}/\{C_1 \times W_1)+(C_2 \times W_2) \ldots +(C_n \times W_n)\}\}*100\% \quad (1)$$

In equation (1), n is an integer greater than one; $C_i$ is the number of critical HA components 112 (see FIG. 1) in an i-th category of the categories received in step 203; $FC_i$ is a number of failed critical HA components in the i-th category of the categories received in step 203, where the failed critical HA components are critical HA components that currently have a failed status as determined in step 210; and $W_i$ is a weight included in the weights 120 (see FIG. 1) that is assigned by an SME prior to step 203 to the i-th category of critical HA components.

For example, in an HA system at a given time, the critical HA components include one root component, two stem components, and two leaf components, and the critical HA components that are in a failed state consist of two leaf components. The weights are assigned as shown in Table 3, presented above. Using equation (1) presented above, the health index is calculated as follows:

Health index={{(1*3)+(2*2)+(2*1)}−{(2*1)}/{(1*3)+(2*2)+(2*1)}}*100%={(9−2)/9}*100%=77.77%

In step 214, HA fault self-healing program 106 (see FIG. 1) stores HAHI 122 (see FIG. 1) and presents the HAHI to a user. In one embodiment, HA fault self-healing program 106 (see FIG. 1) initiates a display of the HAHI on a screen of computer 102 (see FIG. 1) or another computer (now shown).

In step 216, HA fault self-healing program 106 (see FIG. 1) determines whether the HAHI determined in step 212 is 100%. Alternatively, HA fault self-healing program 106 (see FIG. 1) determines in step 216 whether the HAHI is another value that indicates no fault is determined in any of the critical HA components 112 (see FIG. 1). If HA fault self-healing program 106 (see FIG. 1) determines in step 216 that HAHI is equal to 100%, then the Yes branch of step 216 is taken and computer 102 waits in step 218 for a predetermined amount of time. After the waiting period in step 218, the process loops back to step 204 to monitor the critical HA components 112 (see FIG. 1). If HA fault self-healing program 106 (see FIG. 1) determines in step 216 that HAHI is not equal to 100%, then the No branch of step 216 is taken and step 220 in FIG. 2B is performed.

Returning to step 208, if HA fault self-healing program 106 (see FIG. 1) determines that there are no deviations between the aforementioned current values and corresponding reference values, then the No branch of step 208 is taken and computer waits a predetermined period of time in step 218 before looping back to step 204 to monitor the critical HA components 112 (see FIG. 1).

In step 220 in FIG. 2B, HA fault self-healing program 106 (see FIG. 1) receives a first immediate recoverability index (IRI) value indicating critical HA components that are immediately recoverable and a second IRI value indicating critical HA components that are not immediately recoverable. In one embodiment, the first IRI value is 1 and the second IRI value is 0.

Table 4 presented below includes IRI values that are received in step 220. Table 4 indicates how the IRI values vary based on whether an HA component has a hardware fault or a software fault.

TABLE 4

| | | IRI value | |
|---|---|---|---|
| Category of HA component | Weight | Hardware Fault | Software Fault |
| Leaf | 1 | 0 | 1 |
| Stem | 2 | 0 | 1 |
| Root | 3 | 0 | 1 |

In step 222, HA fault self-healing program 106 (see FIG. 1) determines which of the failed critical HA components determined in step 210 (see FIG. 2A) are immediately recoverable and assigns the aforementioned first IRI value to the failed critical HA components that are immediately recoverable. Also in step 222, HA fault self-healing program 106 (see FIG. 1) determines which of the failed critical HA components determined in step 210 (see FIG. 2A) are not immediately recoverable and assigns the aforementioned second IRI value to the failed critical HA components that are not immediately recoverable. In one embodiment, a failure of a hardware component is assigned the IRI value that indicates not immediately recoverable, and a failure of a software component is assigned the IRI value that indicates immediately recoverable. Determining which component is a hardware component and which component is a software component can be performed by critical HA component monitoring tool 110 (see FIG. 1).

In step 224, HA fault self-healing program 106 (see FIG. 1) starts to process each of the failed critical HA components determined in step 210 (see FIG. 2A). In the first iteration of step 224, HA fault self-healing program 106 (see FIG. 1) determines whether the IRI value for the first of the failed critical HA components indicates an immediately recoverable component. If HA fault self-healing program 106 (see FIG. 1) determines in step 224 that the IRI value for the first of the failed critical HA components indicates an immediately recoverable component, then the Yes branch is taken and step 226 is performed.

In step 226, HA fault self-healing program 106 (see FIG. 1) performs step 306 through step 326 (see FIGS. 3A-3B) of a branch based decision making process that invokes self-healing of the critical HA component processed in the most recent iteration of step 224. The branch based decision making process is described below relative to FIGS. 3A-3B. For example, if there is a failure in leaf components, the branch based decision making process includes the steps: (1) Fix faults in the leaf components; (2) Trace down to the stem components that are connected to the leaf components, and check for and fix faults in the stem components; (3) Trace down to the root components connected to the stem components and check for and fix faults in the root components; and (4) if the entire branch is without a fault, check if there are additional branch(es) that may include any of the leaf components. The basic principle of branch based decision making is tracing up and/or down from any point in a faulty branch so that the entire branch (i.e., leaf, stem and root components) is investigated for faults and the faults are fixed.

In step 228, HA fault self-healing program 106 (see FIG. 1) determines whether the IRI value of another failed critical HA component remains to be checked in step 224. If HA fault self-healing program 106 (see FIG. 1) in step 228 determines that there is another failed critical HA component remaining to be processed in step 224, then the Yes branch of step 228 is taken and the process of FIGS. 2A-2B loops back to step 224 to process the next of the failed critical HA components determined in step 210 (see FIG. 2A). Otherwise, HA fault self-healing program 106 (see FIG. 1) determines there are no other failed critical HA components to be processed by step 224, the No branch of step 228 is taken, and step 230 is performed.

In step 230, if HA fault self-healing program 106 (see FIG. 1) determines that monitoring of critical HA components 112 (see FIG. 1) is complete, then the Yes branch of step 230 is taken and the process of FIGS. 2A-2B ends in step 232; otherwise, the monitoring is not complete, and the process of FIGS. 2A-2B loops back to wait the predetermined amount of time in step 218 (see FIG. 2A) and then continue the monitoring in step 204 (see FIG. 2A).

Returning to step 224, if HA fault self-healing program 106 (see FIG. 1) determines the IRI value for the first or next failed critical HA component does not indicate an immediately recoverable component, then the No branch of step 224 is taken and step 234 is performed.

In step 234, HA fault self-healing program 106 (see FIG. 1) generates a problem ticket to report a need for manual intervention for the fault found in the failed critical HA component processed in the most recent iteration of step 224. Step 228, which is described above, follows step 234.

Branch Based Decision Making to Invoke Self-Healing of HA Faults

Figure 3A:
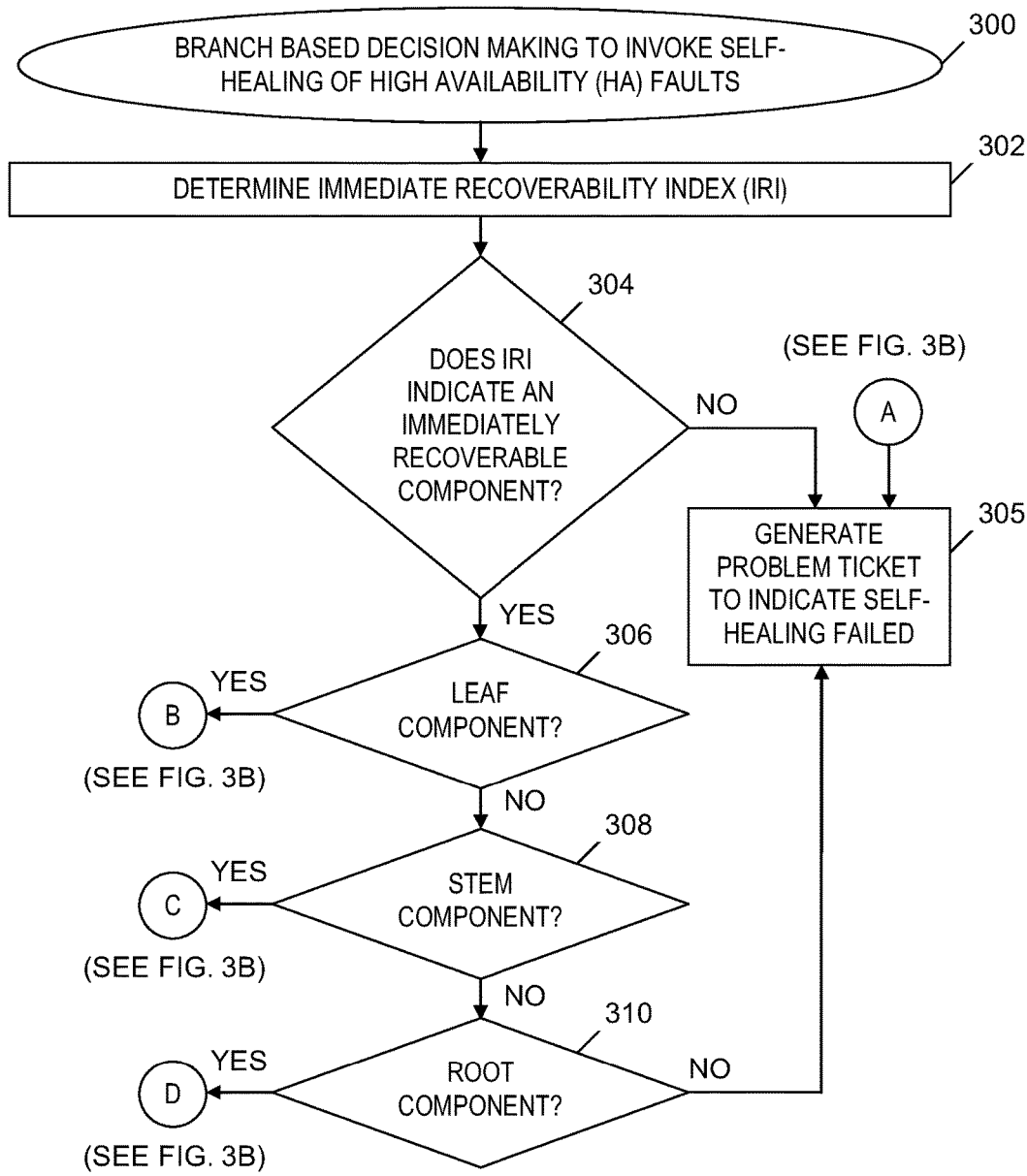
FIGS. 3A-3B depicts a flowchart of a process for branch based decision making to invoke self-healing of HA faults, which is included in the process of FIGS. 2A-2B, in accordance with embodiments of the present invention.
Figure 3B:
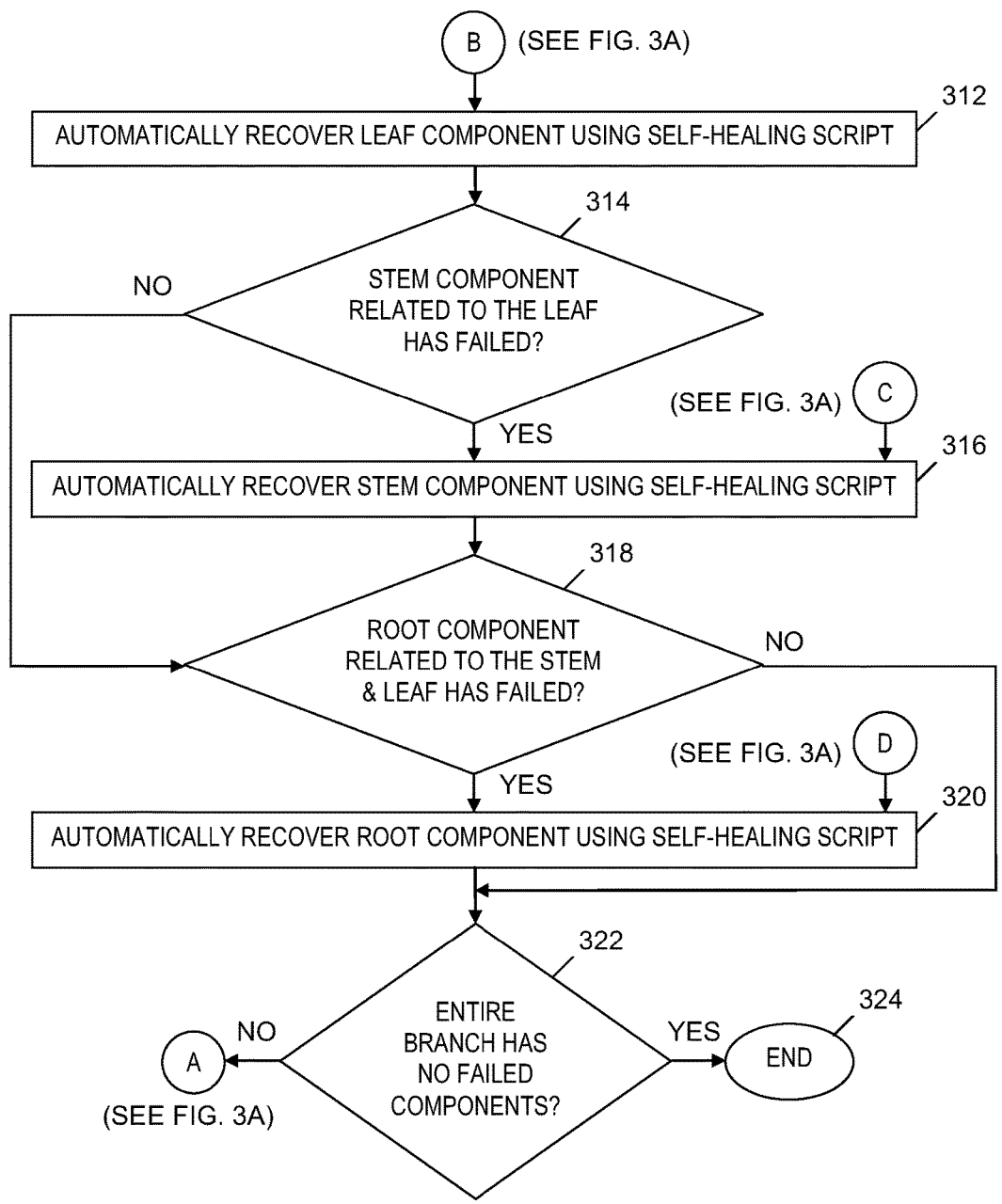

FIGS. 3A-3B depicts a flowchart of a process for branch based decision making to invoke self-healing of HA faults, which is included in the process of FIGS. 2A-2B, in accordance with embodiments of the present invention. The process of FIGS. 3A-3B starts in step 300. In step 302, HA fault self-healing program 106 (see FIG. 1) determines an IRI value of a failed critical HA component.

In step 304, if HA fault self-healing program 106 (see FIG. 1) determines the IRI value determined in step 302 indicates that the failed critical HA component is not an immediately recoverable component, then the No branch of step 304 is taken and step 305 is performed. In step 305, HA fault self-healing program 106 (see FIG. 1) generates a problem ticket to indicate self-healing of the failed critical HA component failed and manual intervention to fix the failed critical HA component is needed, and subsequently the process of FIGS. 3A-3B ends.

If HA fault self-healing program 106 (see FIG. 1) in step 304 determines the IRI value determined in step 302 indicates that the failed critical HA component is an immediately recoverable component, then the Yes branch of step 304 is taken and step 306 is performed.

In step 306, if HA fault self-healing program 106 (see FIG. 1) determines that the failed critical HA component is a leaf component based on the category 118 (see FIG. 1) assigned to the failed critical HA component in step 203 (see FIG. 2A) being a leaf category, then the Yes branch of step 306 is taken and step 312 (see FIG. 3B) is performed. Step 312 is described below in the discussion of FIG. 3B.

If HA fault self-healing program 106 (see FIG. 1) in step 306 determines that the failed critical HA component is not a leaf component based on the category 118 (see FIG. 1) assigned to the failed critical HA component, then the No branch of step 306 is taken and step 308 is performed.

In step 308, if HA fault self-healing program 106 (see FIG. 1) determines that the failed critical HA component is a stem component based on the category 118 (see FIG. 1) assigned to the failed critical HA component in step 203 (see FIG. 2A) being a stem category, then the Yes branch of step 308 is taken and step 316 (see FIG. 3B) is performed. Step 316 is described below in the discussion of FIG. 3B.

If HA fault self-healing program 106 (see FIG. 1) in step 308 determines that the failed critical HA component is not a stem component based on the category 118 (see FIG. 1) assigned to the failed critical HA component, then the No branch of step 308 is taken and step 310 is performed.

In step 310, if HA fault self-healing program 106 (see FIG. 1) determines that the failed critical HA component is a root component based on the category 118 (see FIG. 1) assigned to the failed critical HA component in step 203 (see FIG. 2A) being a root category, then the Yes branch of step 310 is taken and step 320 (see FIG. 3B) is performed. Step 320 is described below in the discussion of FIG. 3B.

If HA fault self-healing program 106 (see FIG. 1) in step 310 determines that the failed critical HA component is not a root component based on the category 118 (see FIG. 1) assigned to the failed critical HA component, then the No branch of step 310 is taken and step 305 is performed. Again, in step 305, HA fault self-healing program 106 (see FIG. 1) generates a problem ticket to indicate self-healing of the failed critical HA component failed and manual intervention to fix the failed critical HA component is needed.

In step 312 in FIG. 3B, HA fault self-healing program 106 (see FIG. 1) uses a self-healing script to automatically recover the leaf component identified in step 306 (see FIG. 3A) immediately preceding step 312.

In step 314, HA fault self-healing program 106 (see FIG. 1) identifies the stem component (i.e., the critical HA component categorized as a stem component) that is related to the aforementioned leaf component. Also in step 314, if HA fault self-healing program 106 (see FIG. 1) determines the stem component related to the aforementioned leaf component has failed (i.e., is a faulty component), then the Yes branch of step 314 is taken and step 316 is performed.

In step 316, HA fault self-healing program 106 (see FIG. 1) automatically recovers the aforementioned stem component using a self-healing script (i.e., fixes the faulty stem component). Step 318 follows step 316.

Returning to step 314, if HA fault self-healing program 106 (see FIG. 1) determines the stem component related to the aforementioned leaf component has not failed, then the No branch of step 314 is taken and step 318 is performed.

In step 318, which follows step 316 and the No branch of step 314, HA fault self-healing program 106 (see FIG. 1) identifies the root component (i.e., the critical HA component categorized as a root component) that is related to the aforementioned stem and leaf component. Also in step 318, if HA fault self-healing program 106 (see FIG. 1) determines the root component related to the aforementioned stem and leaf components has failed, then the Yes branch of step 318 is taken and step 320 is performed.

In step 320, HA fault self-healing program 106 (see FIG. 1) automatically recovers the aforementioned root component using a self-healing script (i.e., fixes the faulty root component). Step 322 follows step 320.

Returning to step 318, if HA fault self-healing program 106 (see FIG. 1) determines the root component related to the aforementioned stem and leaf components has not failed, then the No branch of step 318 is taken and step 322 (see FIG. 3A) is performed.

In step 322, which follows step 320 and the No branch of step 318, HA fault self-healing program 106 (see FIG. 1) determines whether the entire branch that contains the aforementioned leaf, stem and root components has no failed components. If step 322 determines the entire branch has no failed components, then the Yes branch of step 322 is taken and the process of FIGS. 3A-3B ends at step 324. If step 322 determines the entire branch has failed component(s), then the No branch of step 322 is taken and the process continues with step 305 (see FIG. 3A).

Figure 4:
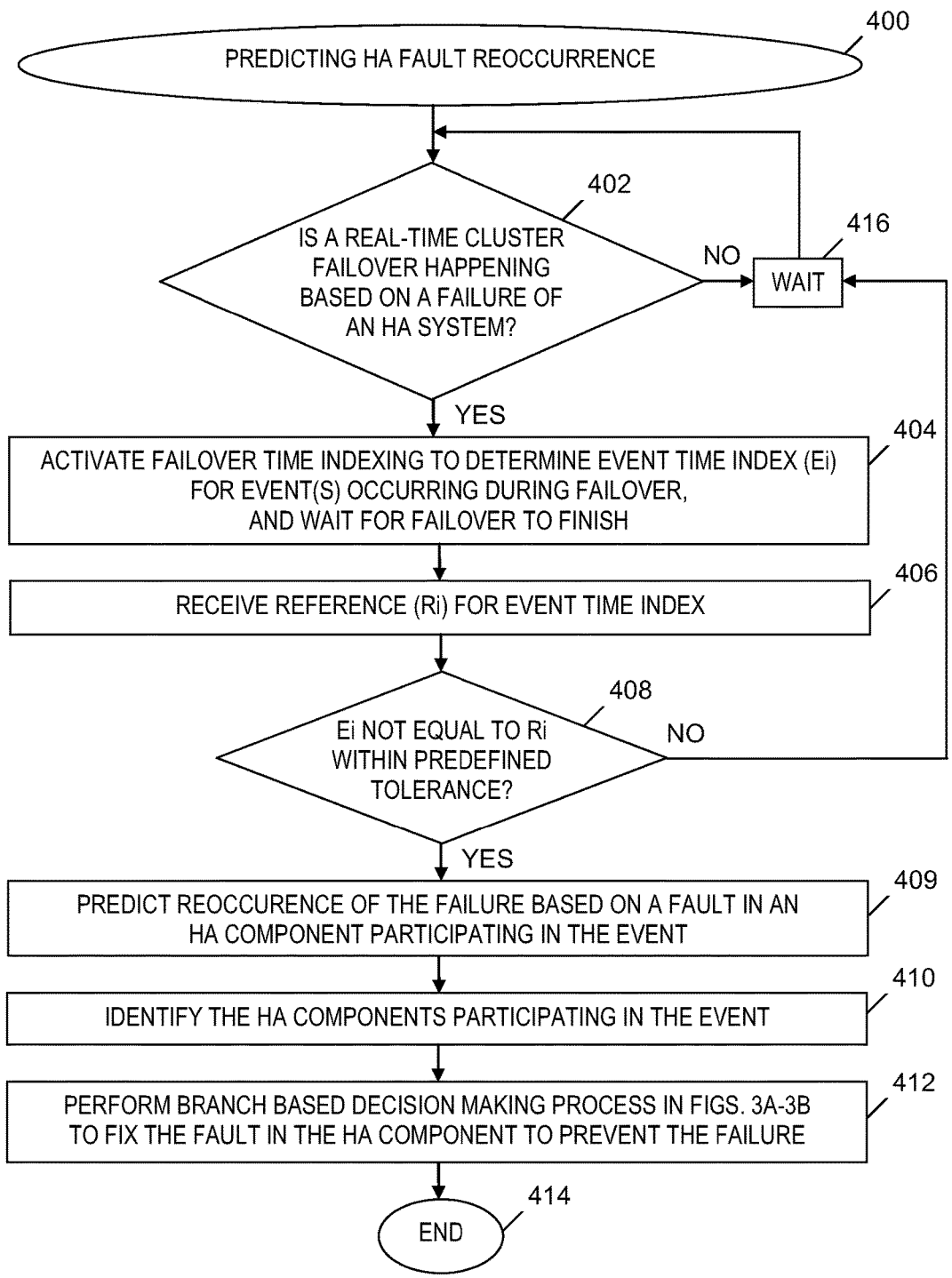
FIG. 4 is a flowchart of a process for predicting HA fault reoccurrence in the system of FIG. 1, in accordance with embodiments of the present invention.

FIG. 4 is a flowchart of a process for predicting HA fault reoccurrence in the system of FIG. 1, in accordance with embodiments of the present invention. The process of FIG. 4 starts at step 400. In step 402, HA fault reoccurrence prediction program 108 (see FIG. 1) determines whether a real-time HA cluster failover is happening based on a failure in a HA system (i.e., a HA cluster). If step 402 determines that the failover is happening, then the Yes branch of step 402 is taken and step 404 is performed.

In step 404, HA fault reoccurrence prediction program 108 (see FIG. 1) activates failover time indexing to determine the actual, real-time event time index of actual amounts of time (Ei) taken by event(s) occurring during the failover. Also in step 404, HA fault reoccurrence prediction program 108 (see FIG. 1) waits for the failover to be completed.

In one embodiment, in response to a failover of a HA cluster node occurring because of an unrecoverable fault to another HA cluster node, HA fault reoccurrence prediction program 108 (see FIG. 1) automatically monitors in real-time the state of each critical HA component and register the time taken for each of the monitored components to change its state from one state to another state, such as changing from online to offline or changing from offline to online. The registered times are included in the aforementioned Ei.

In step 406, HA fault reoccurrence prediction program 108 (see FIG. 1) receives from SME(s) reference event time indexes (Ri), which are reference amounts of time that the event(s) that are occurring during the failover are expected to take. In step 406, HA fault reoccurrence prediction program 108 (see FIG. 1) also receives a tolerance that is defined prior to the process of FIG. 4.

In step 408, HA fault reoccurrence prediction program 108 (see FIG. 1) determines whether any Ei is not equal to the corresponding Ri within the predefined tolerance (e.g., the tolerance is 10% and Ei is not equal to Ri if Ei deviates from Ri by more than 10% of Ri).

If step 408 determines that one or more amounts of times in Ei are not equal to the corresponding one or more reference amounts of time Ri within the predefined tolerance, then the HA components participating in the corresponding event(s) are candidates for failure investigation, the Yes branch of step 408 is taken, and step 409 is performed.

In step 409, based on time(s) in Ei being not equal to corresponding reference amount(s) of time Ri within the predefined tolerance, HA fault reoccurrence prediction program 108 (see FIG. 1) determines that it is likely that there is an error in an HA component participating in the event(s), and based on the likelihood of the error in the HA component, the HA fault reoccurrence prediction program 108 (see FIG. 1) predicts a reoccurrence of the fault on which the failover that was happening in step 402 was based, unless the error in the HA component is repaired.

In step 410, HA fault reoccurrence prediction program 108 (see FIG. 1) identifies the critical HA components that are involved in the event(s) (i.e., the critical HA components that are participating in the event(s)) whose actual amounts of time(s) Ei were determined to be not equal to the corresponding reference amounts of time Ri. In one embodiment, HA fault reoccurrence prediction program 108 (see FIG. 1) determines in step 410 the leaf, stem and root components that participated in an event whose time Ei was not equal to its corresponding reference Ri within the predefined tolerance. HA fault reoccurrence prediction program 108 (see FIG. 1) investigates the entire branch for errors (i.e., faults), where the branch consists of the leaf, stem and root components determined in step 410. In response to the investigation detecting error(s) in the branch, HA fault reoccurrence prediction program 108 (see FIG. 1) performs the branch based decision making in FIGS. 3A-3B to identify the error(s) in the component(s) and based on the identified error(s), to invoke self-healing of the error(s) in the component(s), in order to prevent the predicted reoccurrence of the failure of the HA system.

As an example, an occurrence of an HA cluster failover is detected in real time in step 402. The failover is caused when an HA cluster node fails because of an unrecoverable fault to another node. During the failover, the time taken for each HA component to change its state (e.g., from online to offline or vice versa) is recorded in step 404. A single branch of the HA system that is experiencing the failover includes a filesystem mount point (i.e., a leaf component), a shared data volume (i.e., a stem component), and a shared data volume group (i.e., a root component). Actual times t(A)1, t(A)2 and t(A)3 are recorded in step 404 for changing the state of the shared data volume group in Event 1, changing the state of the shared data volume in Event 2, and changing the state of the filesystem mount point in Event 3, respectively. First, second and third reference times t1, t2, and t3 for Events 1, 2 and 3, respectively, are received in step 406. In step 408, it is determined that actual time t(A)1 exceeds reference time t1 by more than the predefined tolerance level, actual time t(A)2 exceeds reference time t2 by more than the predefined tolerance level, and actual time t(A)3 equals reference time t3. Because Events 1 and 2 took more time than the times indicated in the reference values, HA fault reoccurrence prediction program 108 (see FIG. 1) identifies the root and stem components as candidates that may have faults that contributed to the failure of the HA system, and which may cause a reoccurrence of the failure in the future. The branch based decision making process in step 412 investigates the entire branch that includes the root and stem components and uses the self-healing scripts to fix any faults in the branch that are identified.

Figure 5A:
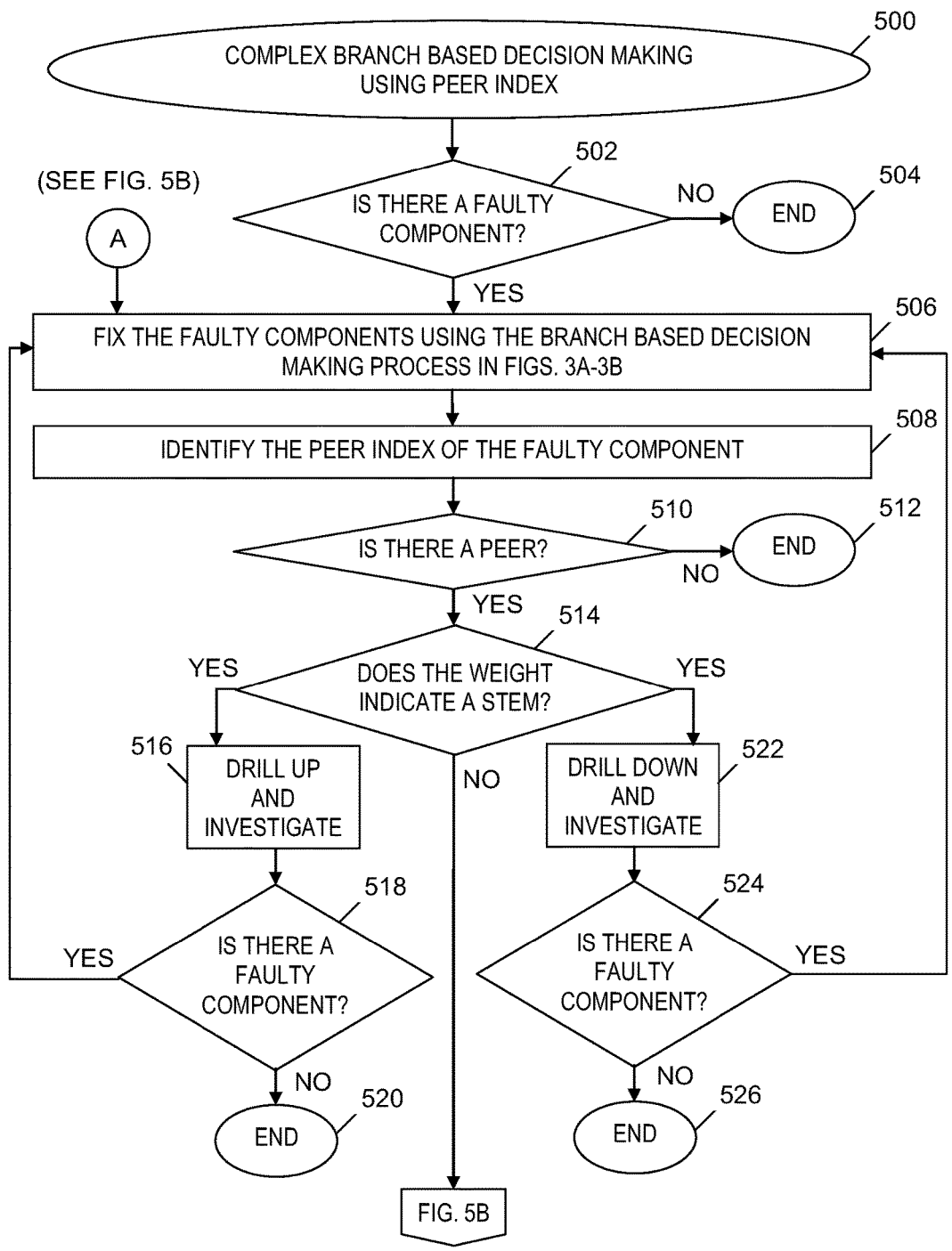
FIGS. 5A-5B depict a flowchart of a process for complex branch based decision making to invoke the process of FIGS. 3A-3B and use peer indexing in the system of FIG. 1, in accordance with embodiments of the present invention.
Figure 5B:
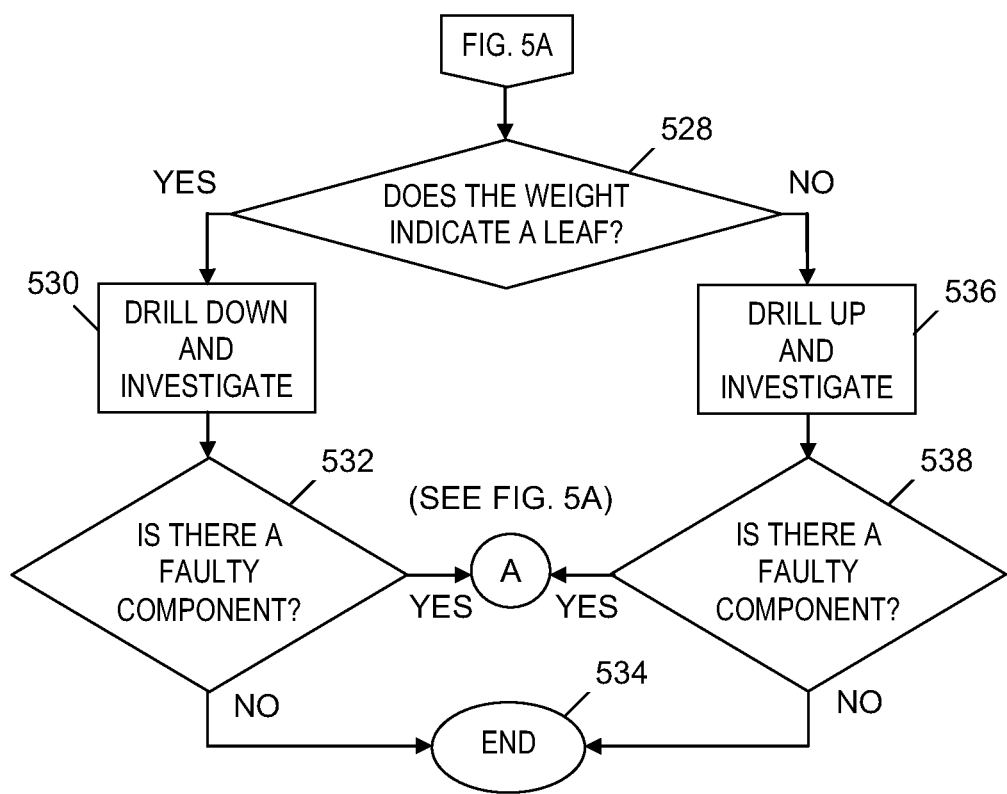

FIGS. 5A-5B depict a flowchart of a process for complex branch based decision making to invoke the process of FIGS. 3A-3B and use peer indexing in the system of FIG. 1, in accordance with embodiments of the present invention. The process of FIGS. 5A-5B starts at step 500. Although not shown, prior to step 502, HA manager 104 (see FIG. 1) performs steps 202, 203, 204 and 206 in FIG. 2A. Furthermore, prior to step 502, HA manager 104 (see FIG. 1) receives and assigns peer indexes, which group as peers respective critical HA components 112 (see FIG. 1) having similar functions within a subsystem. The peers work together collectively to make services highly available. For example, all the disk devices in the disk subsystems are grouped as peers to each other and are assigned the peer index values of Sd1, Sd2 . . . Sdn. As another example, all the host bus adapters in a disk subsystem are grouped as peers to each other and are assigned the peer index values of HBA1, HBA2 . . . HBAn.

In step 502, HA fault self-healing program 106 (see FIG. 1) whether there is a faulty component among critical HA components 112 (see FIG. 1) based on determining a deviation between a current value obtained in step 204 (see FIG. 2A) and a corresponding reference value received in step 206 (see FIG. 2A). If HA fault self-healing program 106 (see FIG. 1) determines in step 502 that there is no faulty component among the critical HA components 112 (see FIG. 1), then the No branch of step 502 is taken and the process ends at step 504. Otherwise, if HA fault self-healing program 106 (see FIG. 1) determines in step 502 that there is a faulty component among the critical HA components 112 (see FIG. 1), then the Yes branch of step 502 is taken and step 506 is performed.

In step 506, HA manager 104 (see FIG. 1) fixes the faulty component by a performing the branch based decision making process in FIGS. 3A-3B.

In step 508, HA fault self-healing program 106 (see FIG. 1) identifies the peer index of the faulty component. A peer index identifies specific instances of HA components that are peers of a given HA component.

Table 5 presented below includes an example of peer indexes assigned to the critical HA components 112 (see FIG. 1) identified in step 202 (see FIG. 2A). Step 508 can use Table 5 to identify the peer index that is associated with the faulty component.

TABLE 5

| Serial number | Environment/ Subsystem | Component | Peer index |
|---|---|---|---|
| 1 | Boot environment | Dual boot disks | Bd1 . . . Bdn |
| 2 | Boot environment | Bootability of each boot disk | Bdy1 . . . Bdyn |
| 3 | Disk subsystem | Physical host bus adapter | HBA1 . . . HBAn |
| 4 | Disk subsystems | SAN data disks | Sd1 . . . Sdn |
| 5 | Disk subsystem | SAN dual paths | Sp1 . . . Spn |
| 6 | Disk subsystems | Shared data volume groups | VG1 . . . VGn |
| 7 | Disk subsystems | Shared data volumes | SV1 . . . SVn |
| 8 | Disk subsystems | Filesystem mount point | FSm1 . . . FSmn |
| 9 | Disk subsystems | Filesystem mount point permission | FSmp1 . . . FSmpn |
| 10 | Disk subsystem | Quorum disks (if any) | Qd1 . . . Qdn |
| 11 | Power supply subsystem | Dual Power supply | PS1 . . . PSn |
| 12 | Network subsystem | Physical network adapter | NIC1 . . . NICn |
| 13 | Network subsystem | Private IP address | IPp1 . . . IPpn |
| 14 | Network subsystem | Public IP address | IPpb1 . . . IPpbn |
| 15 | Network subsystem | Cluster heart beat network | HB1 . . . HBn |
| 16 | Cluster subsystems | Cluster services daemons | QSD1 . . . QSDn |
| 17 | Cluster subsystems | Application startup/stop scripts | AS1 . . . ASn |
| 18 | Cluster subsystems | Application startup/stop scripts permission | ASP1 . . . ASPn |
| 19 | Cluster subsystems | Cluster nodes | CN1 . . . CNn |

In step 510, HA fault self-healing program 106 (see FIG. 1) determines whether the faulty component has a peer based on the peer index identified in step 508. In iterations of step 510 and the subsequent steps in FIG. 5 that are described below, the status of all peer components identified in step 508 are checked in what is known as a sliced or cross cut investigation. If HA fault self-healing program 106 (see FIG. 1) finds a fault in any peer component, then based on the weight of the faulty peer component, the health of the entire branch (i.e., leaf, stem and root) that includes the faulty peer component is checked by drilling up and/or down from the faulty peer component.

If HA fault self-healing program 106 (see FIG. 1) determines in step 510 that the faulty component does not have a faulty peer, where each peer is identified based on the peer index identified in step 508, then the No branch of step 510 is taken and the process ends at step 512. Otherwise, if HA fault self-healing program 106 (see FIG. 1) determines in step 510 that a HA component is a peer of the faulty component based on the peer index identified in step 508, and determines that the peer is faulty, then the Yes branch of step 510 is taken and step 514 is performed.

In step 514, if HA fault self-healing program 106 (see FIG. 1) determines the weight 120 (see FIG. 1) assigned to the peer indicates the peer is a stem component, and then two sequences of steps are performed.

The first sequence of steps starts at step 516. In step 516, HA fault self-healing program 106 (see FIG. 1) drills up (i.e., traverses up the branch from the stem component indicated by the weight in step 514) and investigates the components higher in the branch. In step 518, if HA fault self-healing program 106 (see FIG. 1) determines that there are no faulty components by the investigation of the components higher in the branch, then the No branch of step 518 is taken and the process ends at step 520. If HA fault self-healing program 106 (see FIG. 1) determines in step 518 that there is a faulty component by the investigation of the components higher in the branch, then the Yes branch of step 518 is taken and the process loops back to step 506 to fix the faulty component.

The second sequence of steps starts at step 522. In step 522, HA fault self-healing program 106 (see FIG. 1) drills down (i.e., traverses down the branch from the stem component indicated by the weight in step 514) and investigates the components lower in the branch. In step 524, if HA fault self-healing program 106 (see FIG. 1) determines there are no faulty components by the investigation of the components lower in the branch, then the No branch of step 524 is taken and the process ends at step 526. If HA fault self-healing program 106 (see FIG. 1) determines in step 524 that there is a faulty component by the investigation of the components lower in the branch, then the Yes branch of step 524 is taken and the process loops back to step 506 to fix the faulty component.

Returning to step 514, if HA fault self-healing program 106 (see FIG. 1) determines the weight assigned to the peer indicates the peer is not a stem component, then the No branch of step 514 is taken and step 528 in FIG. 5B is performed.

In step 528, if HA fault self-healing program 106 (see FIG. 1) determines the weight assigned to the peer indicates the peer is a leaf component, then the Yes branch of step 528 is taken and step 530 is performed.

In step 530, HA fault self-healing program 106 (see FIG. 1) drills down (i.e., traverses down the branch from the leaf component indicated by the weight in step 528) and investigates the components lower in the branch. In step 532, if HA fault self-healing program 106 (see FIG. 1) determines there are no faulty components by the investigation of the components lower in the branch, then the No branch of step 532 is taken and the process ends at step 534. If HA fault self-healing program 106 (see FIG. 1) determines in step 532 that there is a faulty component by the investigation of the components lower in the branch, then the Yes branch of step 532 is taken and the process loops back to step 506 (see FIG. 5A) to fix the faulty component.

Returning to step 528, if HA fault self-healing program 106 (see FIG. 1) determines the weight assigned to the peer indicates the peer is not a leaf component (i.e., determines the peer is a root component because of the previous determination in step 514 in FIG. 5A that the peer is not a stem component), then the No branch of step 528 is taken and step 536 is performed.

In step 536, HA fault self-healing program 106 (see FIG. 1) drills up (i.e., traverses up the branch from the root component indicated by the weight in step 528) and investigates the components higher in the branch. In step 538, if HA fault self-healing program 106 (see FIG. 1) determines that there are no faulty components by the investigation of the components higher in the branch, then the No branch of step 538 is taken and the process ends at step 534. If HA fault self-healing program 106 (see FIG. 1) determines in step 538 that there is a faulty component by the investigation of the components higher in the branch, then the Yes branch of step 538 is taken and the process loops back to step 506 (see FIG. 5A) to fix the faulty component.

Although not shown, the steps in FIG. 5 starting at step 510 (See FIG. 5A) are performed for each peer identified in step 508 (see FIG. 5A).

As one example, an HA system includes shared data volumes SV1, SV2, . . . SV5, SAN data disks Sd1, Sd2, . . . Sd5, and filesystem mount points FSm1, FSm2 . . . FSm5, where the shared data volumes are stem components, the SAN data disks are root components, and the filesystem mount points are leaf components. The HA system has five branches, where the first branch consists of Sd1, SV1, and FSm1 as its root, stem, and leaf components, the second branch consists of Sd2, SV2, and FS2 as its root, stem, and leaf components, etc. HA fault self-healing program 106 (see FIG. 1) identifies SV3 as the first identified faulty component in step 502. The faulty component SV3 is fixed in step 506. The peers of SV3 (i.e., SV1, SV2, SV4 and SV5) are included in the peer index identified in step 508. SV1 is identified in step 510 as a peer component of SV3 that is a faulty component. SV1 is identified as a stem component in step 514 and the branch that includes SV1 is traced up and down (i.e., drilled up and down) in steps 516 and 522, respectively. A faulty leaf component FSm1 is identified in step 518 as a result of the trace up in step 516. SV5 is identified in a subsequent performance of step 510 as another peer component of SV3 that is a faulty component. SV5 is identified as a stem component in step 514 and the branch that includes SV5 is traced up and down in steps 516 and 522, respectively. A faulty root component Sdn is identified in step 524 as a result of the trace down in step 522.

Computer System

Figure 6:
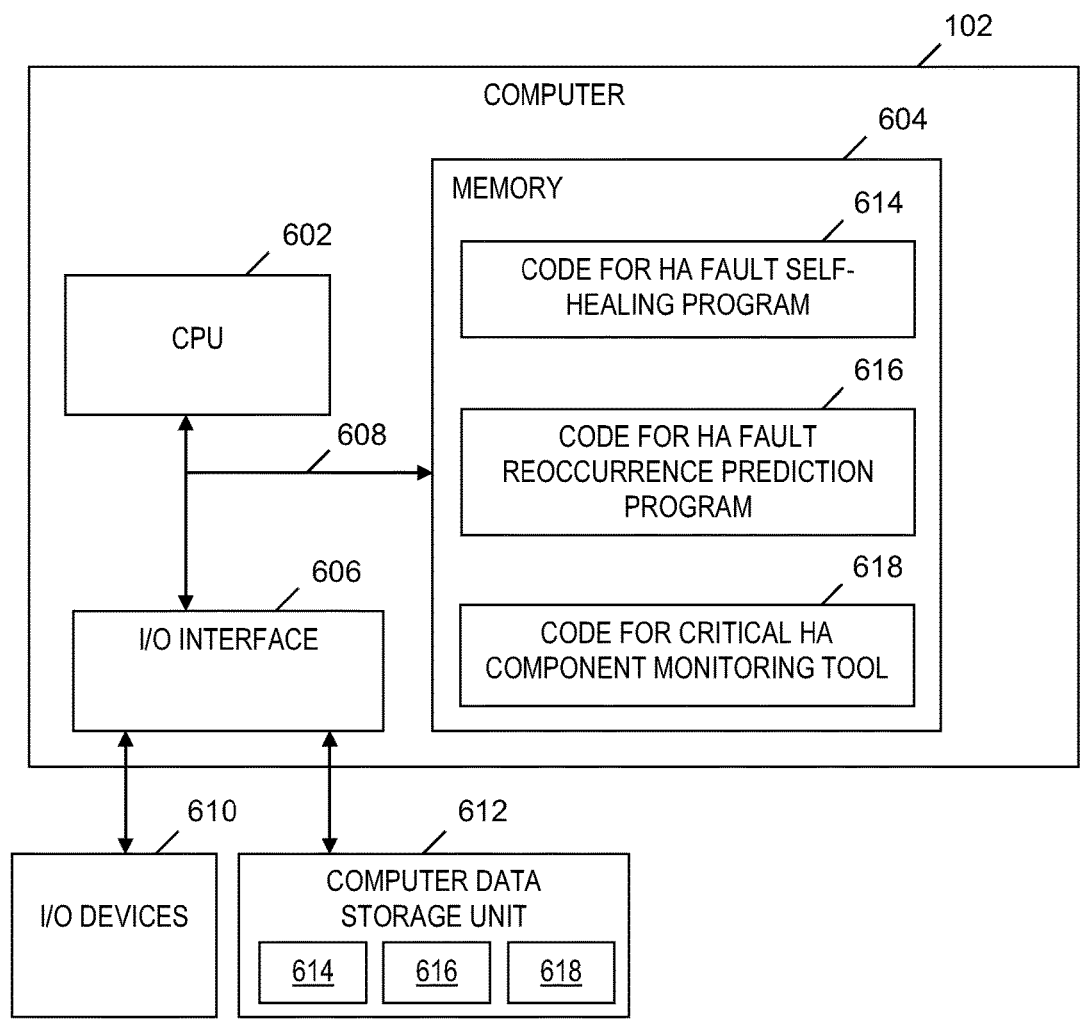
FIG. 6 is a block diagram of a computer that is included in the system of FIG. 1 and that implements the processes of FIGS. 2A-2B, FIGS. 3A-3B, FIG. 4 and FIGS. 5A-5B, in accordance with embodiments of the present invention.

FIG. 6 is a block diagram of a computer that is included in the system of FIG. 1 and that implements the processes of FIGS. 2A-2B, FIGS. 3A-3B, FIG. 4 and FIGS. 5A-5B, in accordance with embodiments of the present invention. Computer 102 generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including executing instructions included in program code 614 for HA fault self-healing program 106 (see FIG. 1), program code 616 for HA fault reoccurrence prediction program 108 (see FIG. 1), and program code 618 for critical HA component monitoring tool 110 (see FIG. 1) to perform a method of managing HA faults, where the instructions are executed by CPU 602 via memory 604. CPU 602 may include a single processing unit, or be distributed across one or more processing units in one or more locations (e.g., on a client and server).

Memory 604 includes a known computer-readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display device (e.g., monitor), keyboard, mouse, printer, speakers, handheld device, facsimile, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). In one embodiment, program code 614, program code 616 and program code 618 are stored on computer data storage unit 612. Computer data storage unit 612 includes a known computer-readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614, 616 and 618 that includes instructions that are executed by CPU 602 via memory 604 to manage HA faults. Although FIG. 6 depicts memory 604 as including program code 614, program code 616 and program code 618, the present invention contemplates embodiments in which memory 604 does not include all of code 614, code 616 and code 618 simultaneously, but instead at one time includes only a portion of code 614, a portion of code 616 and/or a portion of code 618.

Further, memory 604 may include other systems not shown in FIG. 6, such as an operating system (e.g., Linux®) that runs on CPU 602 and provides control of various components within and/or connected to computer 102. Linux is a registered trademark of Linus Torvalds in the United States, other countries, or both.

In one embodiment, storage unit 612 and/or one or more other computer data storage units (not shown) that are coupled to computer 102 store critical HA components 112 (see FIG. 1), critical HA component categories 118 (see FIG. 1), assigned weights 120 (see FIG. 1), HA health index 122 (see FIG. 1), and immediate recoverability indexes 124 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 604 and/or computer data storage unit 612) having computer-readable program code (e.g., program code 614) embodied or stored thereon.

Any combination of one or more computer-readable mediums (e.g., memory 604 and computer data storage unit 612) may be utilized. In one embodiment, the computer-readable medium is a computer-readable storage medium. In another embodiment, the computer-readable medium is a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate, and is not a transitory form of signal transmission. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 614) for use by or in connection with a system, apparatus, or device for carrying out instructions in the program, and which does not propagate. The term "computer-readable storage device" does not include signal propagation media such as copper cables, optical fibers and wireless transmission media.

A computer-readable signal medium includes a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 614) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 614) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer 102 or another computer system (not shown) having components analogous to the components of computer 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 and FIG. 3) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to one or more hardware processors (e.g., CPU 602) of a general purpose computer, special purpose computer, or other programmable data processing apparatus to produce a machine, such that the instructions, which are executed via the processor(s) of the computer or other programmable data processing apparatus, create means for implementing the functions/acts specified in the flowcharts and/or block diagram block or blocks.

These computer program instructions may also be stored in a computer-readable medium (e.g., memory 604 or computer data storage unit 612) that can direct a computer (e.g., computer 102), other programmable data processing apparatus, or other devices to function in a particular manner, such that the instructions (e.g., program 614) stored in the computer-readable medium produce an article of manufacture including instructions which implement the function/act specified in the flowcharts and/or block diagram block or blocks.

The computer program instructions may also be loaded onto a computer (e.g., computer 102), other programmable data processing apparatus, or other devices to cause a series of operational steps to be performed on the computer, other programmable apparatus, or other devices to produce a computer-implemented process such that the instructions (e.g., program 614) which are executed on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to managing HA faults. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to manage HA faults. Another embodiment discloses a process for providing at least one support service for at least one of creating, integrating, hosting, maintaining, and deploying computer-readable program code 614 in computer 102, where program code 614 is executed by CPU 602 to implement the steps included in FIGS. 2A-2B, FIGS. 3A-3B, FIG. 4, and FIGS. 5A-5B.

The flowcharts in FIGS. 2A-2B, FIGS. 3A-3B, FIG. 4, and FIGS. 5A-5B and the block diagrams in FIG. 1 and FIG. 6 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 614), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a failure of a critical high availability (HA) component, the method comprising the steps of:

a computer receiving and assigning weights to categories of a plurality of critical HA components of a HA system;

the computer obtaining a current value indicating a performance of a critical HA component included in the plurality of critical HA components, the current value obtained by periodically monitoring the plurality of critical HA components;

the computer receiving a reference value for the performance of the critical HA component;

the computer determining a deviation between the current value and the reference value;

based on the deviation, the computer determining the critical HA component has failed; and based in part on the failed critical HA component, the categories, and the weights, the computer determining a health index in real-time, the health index indicating in part how much the critical HA component having failed affects a measure of health of the HA system.

2. The method of claim 1, further comprising the steps of:

the computer determining n counts $C_1 \ldots C_n$, wherein $C_i$ in $C_1 \ldots C_n$ is a count of how many of the critical HA components are assigned to an i-th category of the categories assigned to the critical HA components; and the computer determining n counts $FC_1 \ldots FC_n$, wherein $FC_i$ in $FC_1 \ldots FC_n$ is a count of how many of the critical HA components that are assigned in the i-th category have a failed status, wherein the categories consist of n categories, wherein the weights consist of n weights $W_1 \ldots W_n$, wherein n is an integer greater than one, wherein the step of determining the health index includes the step of the computer determining: $\{\{\{C_1 \times W_1) + \ldots + (C_n \times W_n)\} - \{(FC_1 \times W_1) + \ldots + (FC_n \times W_n)\}\}/\{C_1 \times W_1) + \ldots + (C_n \times W_n)\}\} * 100\%$.

3. The method of claim 1, further comprising the steps of:
the computer determining the health index is not equal to 100%;
based on the health index not being equal to 100%, the computer receiving indexes corresponding to respective critical HA components, each index indicating whether the respective critical HA component is an immediately recoverable component;
based on the received index corresponding to the critical HA component that has failed, the computer determining whether the critical HA component that has failed is an immediately recoverable component, in response to a determination that the critical HA component that has failed is the immediately recoverable component, the computer performing branch based decision making to automatically recover the critical HA component, and in response to a determination that the critical HA component that has failed is not the immediately recoverable component, the computer generating a ticket indicating a need for human intervention to recover the critical HA component.

4. The method of claim 3, wherein the step of determining whether the critical HA component that has failed is the immediately recoverable component includes determining whether the critical HA component is a hardware component or a software component, the critical HA component being the hardware component indicating the critical HA component is not the immediately recoverable component, and the critical HA component being the software component indicating the critical HA component is the immediately recoverable component.

5. The method of claim 3, wherein the step of performing the branch based decision making includes the steps of:
the computer determining whether the critical HA component is assigned to a leaf category included in the categories, wherein the categories consist of the leaf category, a stem category, and a root category;
in response to a determination that the critical HA component is assigned to the leaf category, the computer automatically recovering the critical HA component by invoking a self-healing script for the leaf category;
in response to a determination that the critical HA component is not assigned to the leaf category, the computer determining whether the critical HA component is assigned to the stem category;
in response to a determination that the critical HA component is assigned to the stem category, the computer automatically recovering the critical HA component by invoking a self-healing script for the stem category;
in response to a determination that the critical HA component is not assigned to the stem category, the computer determining whether the critical HA component is assigned to the root category;
in response to a determination that the critical HA component is assigned to the root category, the computer automatically recovering the critical HA component by invoking a self-healing script for the root category; and
in response to a determination that the critical HA component is not assigned to the root category, the computer generating a ticket indicating a self-healing of the critical HA component has failed.

6. The method of claim 5, further comprising the steps of:
subsequent to recovering the critical HA component by invoking the self-healing script for the leaf, stem or root category, the computer identifying a peer index of the critical HA component;
based on the peer index, the computer determining a peer of the critical HA component, the peer index indicating the peer and the critical HA component have substantially similar functions in a subsystem;
the computer determining whether a weight assigned to the peer indicates the peer is in the stem, leaf, or root category;
in response to a determination that the weight assigned to the peer indicates the peer is in the stem category,
the computer traversing up a branch from the peer to one or more critical HA components in the leaf category, performing the branch based decision making on the one or more critical HA components to determine if any of the one or more critical HA components have failed, and performing a self-healing to recover any of the one or more critical HA components that have failed; and
the computer traversing down the branch from the peer to a critical HA component in the root category, performing the branch based decision making to determine if the critical HA component in the root category has failed, and performing a self-healing to recover the critical HA component in the root category that has failed;
in response to a determination that the weight assigned to the peer indicates the peer is in the leaf category, the computer traversing down the branch from the peer to a critical HA component in the stem category, performing the branch based decision making to determine if the critical HA component in the stem category has failed, and performing a self-healing to recover the critical HA component in stem category that has failed; and
in response to a determination that the weight assigned to the peer indicates the peer is in the root category, the computer traversing up the branch from the peer to one or more critical HA components in the stem category, performing the branch based decision making to determine if any of the one or more critical HA components in the stem category have failed, and performing a self-healing to recover any of the one or more critical HA components in the stem category that have failed.

7. The method of claim 1, further comprising the step of:
providing at least one support service for at least one of creating, integrating, hosting, maintaining, and deploying computer-readable program code in the computer, the program code being executed by a processor of the computer to implement the steps of receiving and assigning weights to the categories, obtaining the current value indicating the performance of the critical HA component, receiving the reference value for the performance of the critical HA component, determining the deviation between the current value and the reference value, determining the critical HA component has failed, and determining the health index in real-time.

8. The computer of claim 1, one or more processors of the computer, one or more computer-readable memories, one or more computer-readable storage devices, other computer hardware, and program instructions which are stored on the one or more storage devices for execution by the one or more processors via the one or more memories and when executed by the one or more processors with the other computer hardware perform the method of claim 1.

9. A computer program product comprising:
a computer-readable, tangible storage device; and
a computer-readable program code stored in the computer-readable, tangible storage device, the computer-readable program code containing instructions that are executed by a central processing unit (CPU) of a computer system to implement a method of managing a failure of a critical high availability (HA) component, the method comprising the steps of:
the computer system receiving and assigning weights to categories of a plurality of critical HA components of a HA system;
the computer system obtaining a current value indicating a performance of a critical HA component included in the plurality of critical HA components, the current value obtained by periodically monitoring the plurality of critical HA components;
the computer system receiving a reference value for the performance of the critical HA component;
the computer system determining a deviation between the current value and the reference value;
based on the deviation, the computer system determining the critical HA component has failed; and
based in part on the failed critical HA component, the categories, and the weights, the computer system determining a health index in real-time, the health index indicating in part how much the critical HA component having failed affects a measure of health of the HA system.

10. The program product of claim 9, wherein the method further comprises the steps of:
the computer system determining n counts $C_1 \ldots C_n$, wherein $C_i$ in $C_1 \ldots C_n$ is a count of how many of the critical HA components are assigned to an i-th category of the categories assigned to the critical HA components; and
the computer system determining n counts $FC_1 \ldots FC_n$, wherein $FC_i$ in $FC_1 \ldots FC_n$ is a count of how many of the critical HA components that are assigned in the i-th category have a failed status,
wherein the categories consist of n categories, wherein the weights consist of n weights $W_1 \ldots W_n$, wherein n is an integer greater than one, wherein the step of determining the health index includes the step of the computer system determining: $\{\{\{C_1 \times W_1) + \ldots + (C_n \times W_n)\} - \{(FC_1 \times W_1) + \ldots + (FC_n \times W_n)\}\} / \{C_1 \times W_1) + \ldots + (C_n \times W_n)\}\} * 100\%$.

11. The program product of claim 9, wherein the method further comprises the steps of:
the computer system determining the health index is not equal to 100%;
based on the health index not being equal to 100%, the computer system receiving indexes corresponding to respective critical HA components, each index indicating whether the respective critical HA component is an immediately recoverable component;
based on the received index corresponding to the critical HA component that has failed, the computer system determining whether the critical HA component that has failed is an immediately recoverable component, in response to a determination that the critical HA component that has failed is the immediately recoverable component, the computer system performing branch based decision making to automatically recover the critical HA component, and in response to a determination that the critical HA component that has failed is not the immediately recoverable component, the computer system generating a ticket indicating a need for human intervention to recover the critical HA component.

12. The program product of claim 11, wherein the step of determining whether the critical HA component that has failed is the immediately recoverable component includes determining whether the critical HA component is a hardware component or a software component, the critical HA component being the hardware component indicating the critical HA component is not the immediately recoverable component, and the critical HA component being the software component indicating the critical HA component is the immediately recoverable component.

13. The program product of claim 11, wherein the step of performing the branch based decision making includes the steps of:
the computer system determining whether the critical HA component is assigned to a leaf category included in the categories, wherein the categories consist of the leaf category, a stem category, and a root category;
in response to a determination that the critical HA component is assigned to the leaf category, the computer system automatically recovering the critical HA component by invoking a self-healing script for the leaf category;
in response to a determination that the critical HA component is not assigned to the leaf category, the computer system determining whether the critical HA component is assigned to the stem category;
in response to a determination that the critical HA component is assigned to the stem category, the computer system automatically recovering the critical HA component by invoking a self-healing script for the stem category;
in response to a determination that the critical HA component is not assigned to the stem category, the computer system determining whether the critical HA component is assigned to the root category;
in response to a determination that the critical HA component is assigned to the root category, the computer system automatically recovering the critical HA component by invoking a self-healing script for the root category; and
in response to a determination that the critical HA component is not assigned to the root category, the computer system generating a ticket indicating a self-healing of the critical HA component has failed.

14. The program product of claim 13, wherein the method further comprises the steps of:
subsequent to recovering the critical HA component by invoking the self-healing script for the leaf, stem or root category, the computer system identifying a peer index of the critical HA component;
based on the peer index, the computer system determining a peer of the critical HA component, the peer index indicating the peer and the critical HA component have substantially similar functions in a subsystem;
the computer system determining whether a weight assigned to the peer indicates the peer is in the stem, leaf, or root category;
in response to a determination that the weight assigned to the peer indicates the peer is in the stem category,
the computer system traversing up a branch from the peer to one or more critical HA components in the leaf category, performing the branch based decision making on the one or more critical HA components to determine if any of the one or more critical HA components have failed, and performing a self-healing to recover any of the one or more critical HA components that have failed; and the computer system traversing down the branch from the peer to a critical HA component in the root category, performing the branch based decision making to determine if the critical HA component in the root category has failed, and performing a self-healing to recover the critical HA component in the root category that has failed;

in response to a determination that the weight assigned to the peer indicates the peer is in the leaf category, the computer system traversing down the branch from the peer to a critical HA component in the stem category, performing the branch based decision making to determine if the critical HA component in the stem category has failed, and performing a self-healing to recover the critical HA component in stem category that has failed; and in response to a determination that the weight assigned to the peer indicates the peer is in the root category, the computer system traversing up the branch from the peer to one or more critical HA components in the stem category, performing the branch based decision making to determine if any of the one or more critical HA components in the stem category have failed, and performing a self-healing to recover any of the one or more critical HA components in the stem category that have failed.

* * * * *